(12) United States Patent
Furuse (10) Patent No.: US 6,624,545 B1
(45) Date of Patent: Sep. 23, 2003

(54) ELECTRIC ROTATING MACHINE AND MANUFACTURING METHOD THEREOF

(75) Inventor: Hisayuki Furuse, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 45 days.

(21) Appl. No.: 09/678,311

(22) Filed: Oct. 3, 2000

(30) Foreign Application Priority Data

Oct. 4, 1999 (JP) .......................................... 11-282352

(51) Int. Cl.⁷ ............................................... H02K 71/08
(52) U.S. Cl. ...................... 310/217; 310/218; 310/114; 310/259
(58) Field of Search ................................ 310/217, 218, 310/102 R, 112, 114, 259

(56) References Cited

U.S. PATENT DOCUMENTS

| | | | | |
|---|---|---|---|---|
| 3,597,646 A | * | 8/1971 | Lawrenson | 310/211 |
| 3,683,249 A | * | 8/1972 | Shibata | 318/205 |
| 5,793,136 A | * | 8/1998 | Redzic | 310/114 |
| 6,114,784 A | * | 9/2000 | Nakano | 310/59 |

FOREIGN PATENT DOCUMENTS

JP        9-275673        10/1997

* cited by examiner

Primary Examiner—Thanh Lam
(74) Attorney, Agent, or Firm—Foley & Lardner (57) ABSTRACT

An electric rotating machine is equipped with a middle core, an outer core disposed outside the middle core which rotates relative to the middle core, and an inner core disposed inside the middle core which rotates relative to the middle core. The middle core comprises plural plates disposed in an axial direction. The plural plates are connected in the axial direction by a connecting member, and joined to a first fixing member. The inner and outer circumferential surfaces are finished in the state where the plates are joined only to the first fixing member, and the opposite side to the first fixing member is joined to a second fixing member after finishing.

2 Claims, 10 Drawing Sheets

ELECTRIC ROTATING MACHINE AND MANUFACTURING METHOD THEREOF

FIELD OF THE INVENTION

The present invention relates to an electric rotating machine, such as a motor and generator, and in particular to an electric rotating machine wherein one stator and two rotors are arranged coaxially.

BACKGROUND OF THE INVENTION

A rotator core and stator core of an electric rotating machine are formed of layers of thin plates such as silicon-steel plate. Generally, thin plates are joined by welding. However, since a convex projection arises in the welding position, the gap between the cores cannot be made small. That is, if the gap is made small, the core facing the convex projection will interfere with the convex projection.

Hence, the opposite side of a magnetic pole-face is welded so that there is no weld part with a surface (magnetic pole-face) facing another core.

SUMMARY OF THE INVENTION

However, in the electric rotating machine in which one stator and two rotors are arranged coaxially as disclosed by JP-A-H9-275673 published by the Japanese Patent Office in 1997, both the inner and external surfaces of a core in the middle are magnetic pole-faces, so the opposite side of the magnetic pole-face cannot be welded as mentioned above.

If one of the surfaces is welded, the gap with the core facing the welded surface cannot be made small.

It is therefore an object of this invention to eliminate the above-mentioned convex projection, and make the gap between cores small.

In order to achieve above object, this invention provides an electric rotating machine, comprising a middle core comprising plural plates (2A, 23A) stacked in an axial direction, an outer core disposed outside the middle core, and which rotates relative to the middle core, and an inner core disposed inside the middle core, and which rotates relative to the middle core. The plural plates are joined to a first fixing member by a connecting member.

According to an aspect of the invention, this invention provides a method of manufacturing an electric rotating machine, the machine having a middle core comprising plural plates stacked in an axial direction, an outer core disposed outside the middle core which rotates relative to the middle core, and an inner core disposed inside the middle core which rotates relative to the middle core, the method comprising joining the plural plates to a first fixing member by a connecting member, and finishing the inner and outer circumferential surfaces of the plural plates in the state where the plural plates are joined only to the first fixing member.

The details as well as other features and advantages of this invention are set forth in the remainder of the specification and are shown in the accompanying drawings.

DESCRIPTION OF THE PREFERRED EMBODIMENTS

Figure 1:
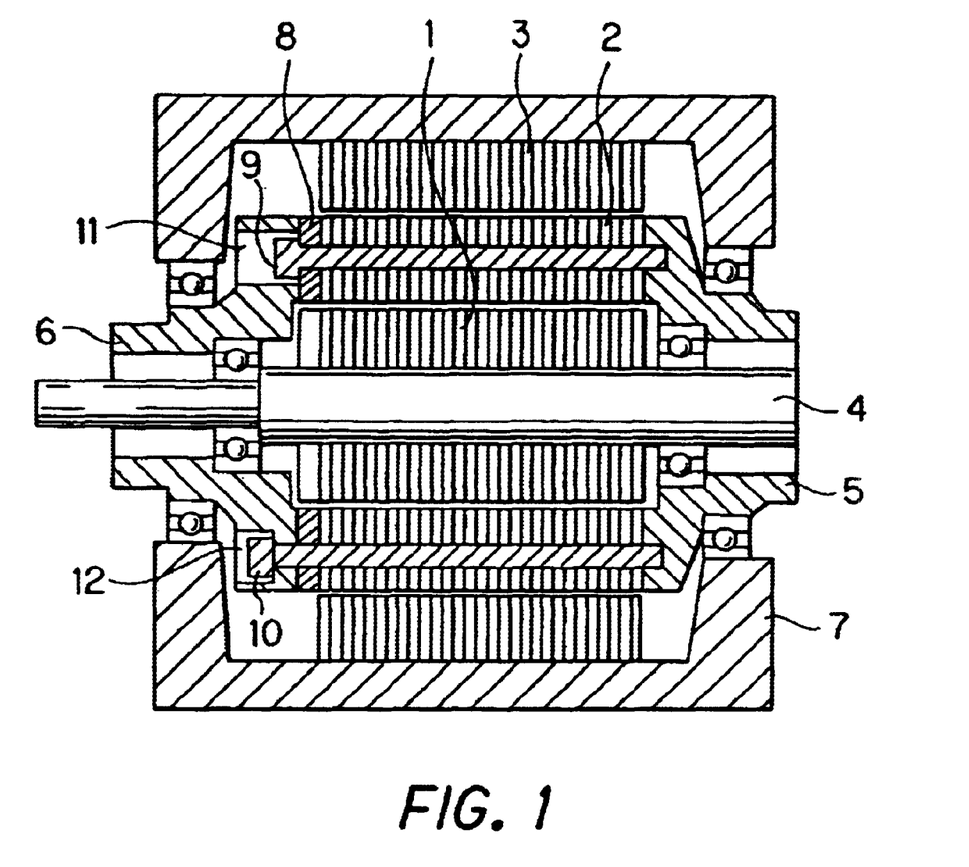
FIG. 1 shows a schematic cross-sectional view of an electric rotating machine according to this invention.

Referring to FIG. 1 of the drawings, an electric rotating machine of this invention is equipped with an inner rotor core 1 (inner core), an outer rotor core 2 (middle core), and a stator core 3 (outer core) in a housing 7. The outer rotor core 2 is arranged outside the inner rotor core 1, and the stator core 3 is arranged outside the outer rotor core 2. The inner rotor core 1 and the outer rotor core 2 rotate relative to each other, and the outer rotor core 2 and stator core 3 also rotate relative to each other.

The inner rotor core 1, outer rotor core 2 and stator core 3 are respectively formed in stacks of plural thin silicon steel plates in the axial direction. The inner rotor core 1 is supported by a shaft 4. The outer rotor core 2 is fixed to a right flange 5 and a left flange 6. The stator 3 is fixed to the housing 7.

The electric rotating machine shown in FIG. 1 is manufactured as follows.

In the inner rotor core 1 and stator core 3, only the surfaces facing the outer rotor core 2 are magnetic pole-faces, so the stacked thin plates can be joined by welding the opposite sides to the magnetic pole-faces. After welding, the parts corresponding to the magnetic pole-faces of the joined thin plates are surface-finished.

Figure 2:
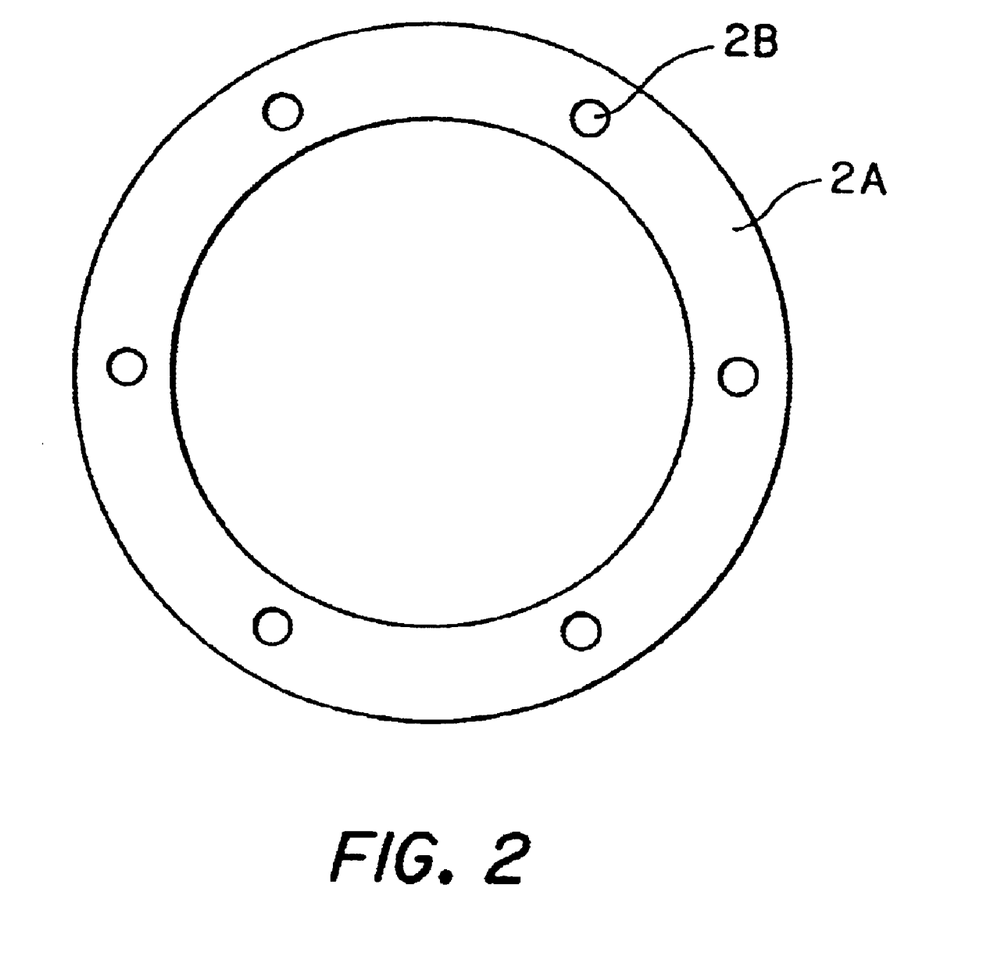
FIG. 2 shows a thin plate forming an external rotor core of the electric rotating machine.

However, both the inner circumferential surface and outer circumferential surface of the outer rotor core 2 are magnetic pole-faces, so the thin plates cannot be joined by welding. Therefore, holes 2B are provided in the thin plates 2A forming the outer rotor core 2, as shown in FIG. 2, and the plates are joined by passing bolts 9 through these holes 2B.

Figure 3:
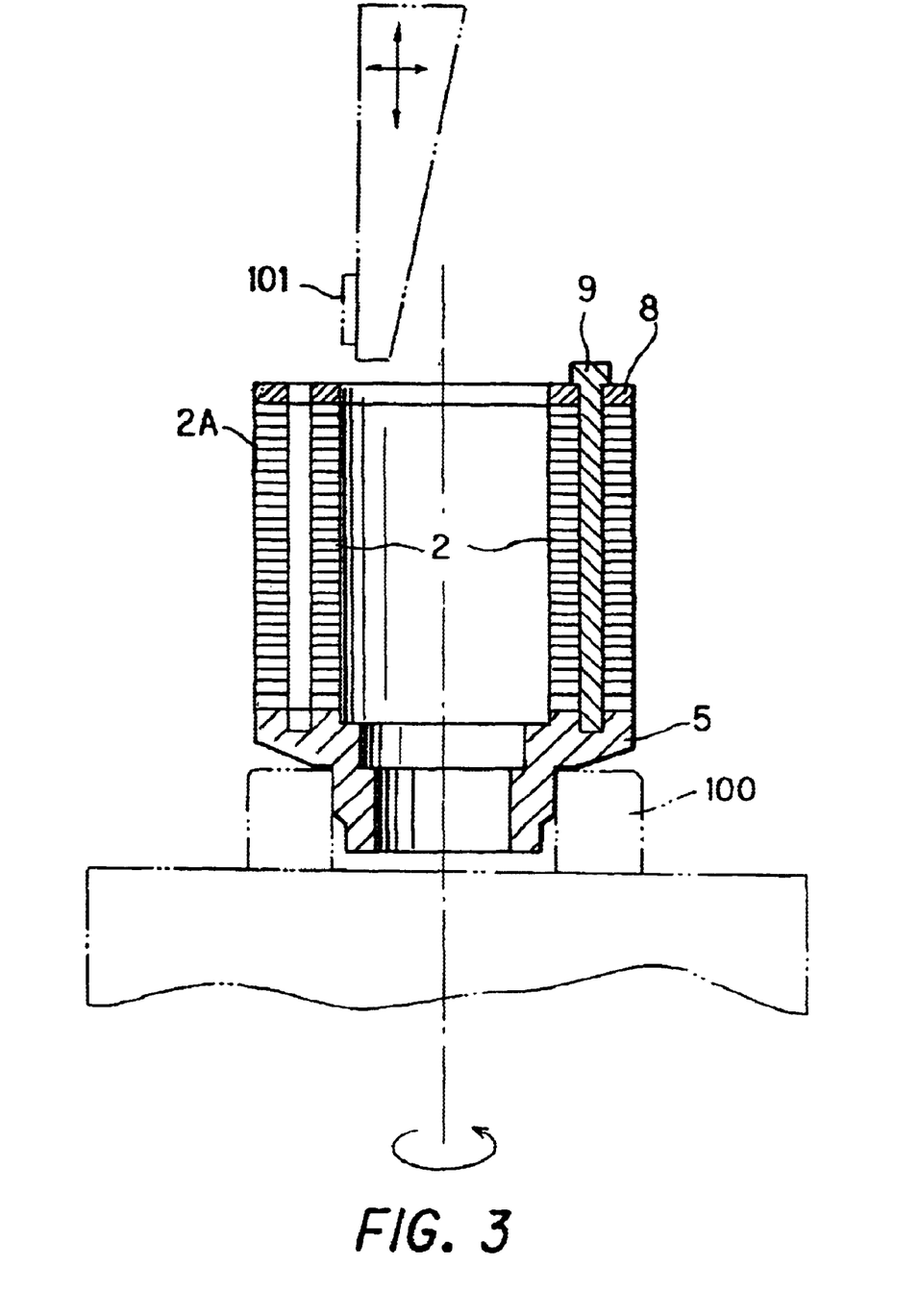
FIG. 3 shows a schematic cross-sectional view of the electric rotating machine during assembly.

Specifically, first, plural thin plates 2A are stacked, and fixed to the right flange 5 by bolts 9 together with a plate 8. Next, as shown in FIG. 3, the right flange 5 to which the thin plates 2A and plate 8 are pre-attached is fitted on a chuck 100 of a grinding machine, and then the inner circumferential surface and outer circumferential surface of the outer rotor core 2 are ground with a grindstone 101 by rotating them. As the upper side of the figure is open, the inner circumferential surface of the outer rotor core 2 can easily be surface-finished. Here, grinding is used as the surface-finishing method, but other surface-finishing method may be used if the inner circumferential surface and outer circumferential surface of the outer rotor core 2 can be surface-finished by it.

After surface-finishing is complete, the inner rotor which is pre-assembled beforehand is inserted, and attached via a bearing.

Figure 4:
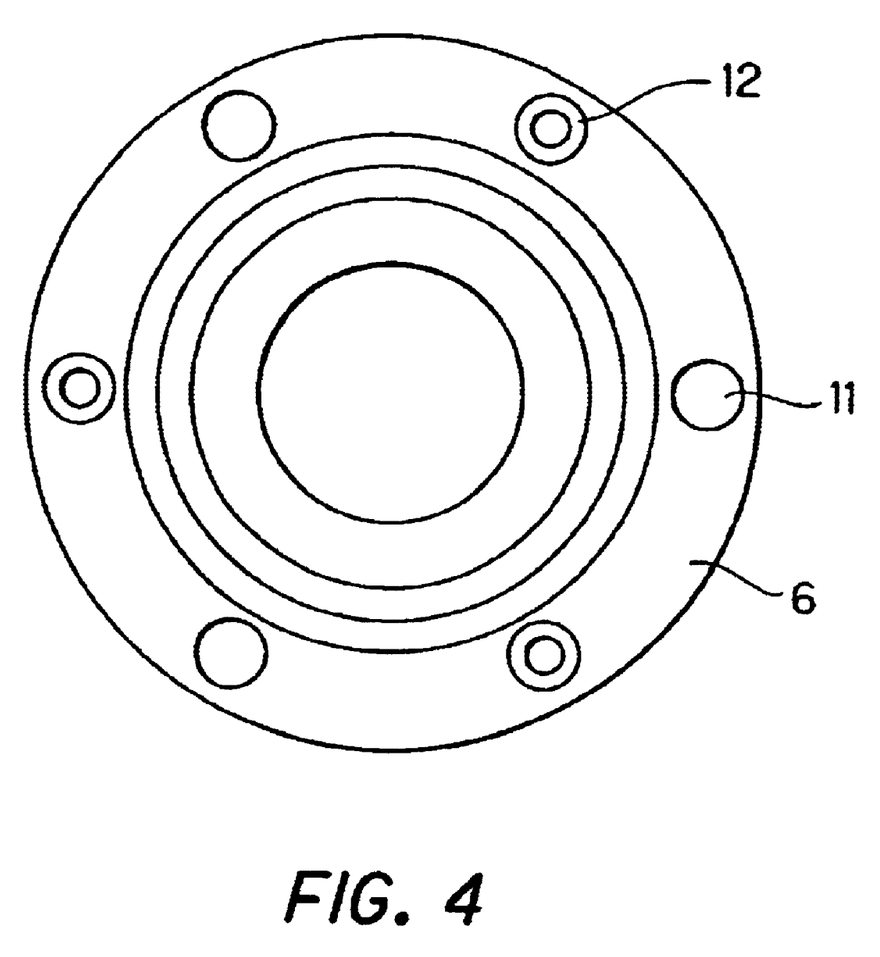
FIG. 4 shows the left flange of the electric rotating machine.

Plural holes 11 through which the heads of the bolts 9 pass and plural holes 12 which have a seat for a fixing bolt 10 are alternately formed on the same circumference in the left flange as shown in FIG. 4. The outer rotor core 2 is fixed to the left flange 6 by the bolts 10.

Therefore, the outer core 2 is fixed to the right flange 5 by the bolts 9 (for example, three or more bolts on the same circumference) and is not fixed to the left flange 6 in the state shown in FIG. 3, but after the inner rotor core 1 is inserted in the outer rotor core 2, it is fixed to both the left flange 6 and right flange 5 by the bolts 10 (for example, three or more bolts on the same circumference).

The outer rotor core 2, right flange 5, left flange 6, plate 8 and bolts 9 are formed in one piece to form the outer rotor.

Holes, not shown, in which permanent magnets are disposed, are provided in the inner rotor core 1 and the outer rotor core 2. Parts, not shown, in which coils are installed, are provided in the stator core 3. These permanent magnets and coils are pre-attached to the rotor cores 1 and 2 or the stator core 3 prior to assembly.

Therefore, both the inner circumferential surface and outer circumferential surface are magnetic pole-faces, but according to this invention, the inner circumferential surface and outer circumferential surface can be finished in the state where only one side is attached to the right flange 5, so machining of the inner circumferential surface is easy. Hence, the magnetic pole-faces can be finished precisely and the gap between cores can be made small. Moreover, since welding is not used, the magnetic pole-faces are protected.

Figure 5:
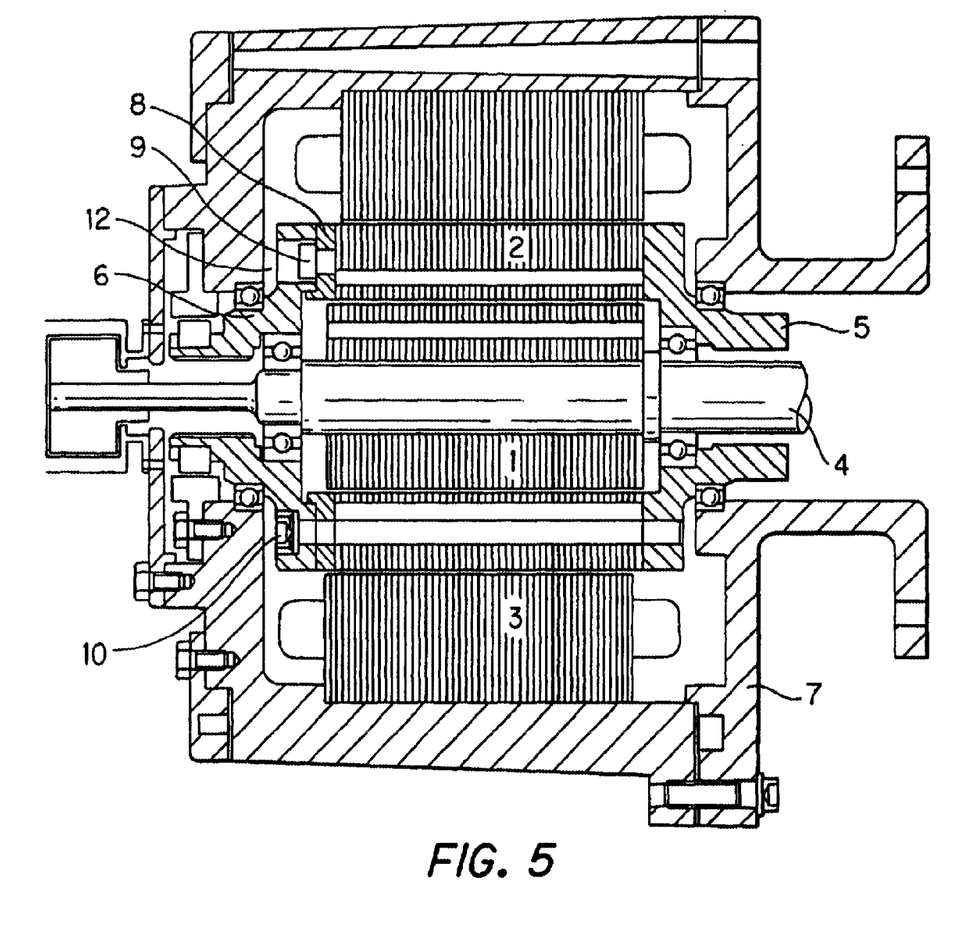
FIG. 5 shows the detailed cross-sectional view of the electric rotating machine.

FIG. 5 shows a detailed cross section of the electric rotating machine shown in FIG. 1. In FIG. 1, the construction is simplified so that it is easy to understand. The shape of structural components is different between FIG. 1 and FIG. 5, but components referred to by the same symbols are the same components.

The thin plates forming the inner core 1 and stator 3 are joined by welding, but holes may be opened in the thin plates forming these components as in the case of the outer rotor core 2 and they may be joined by bolts.

Figure 6:
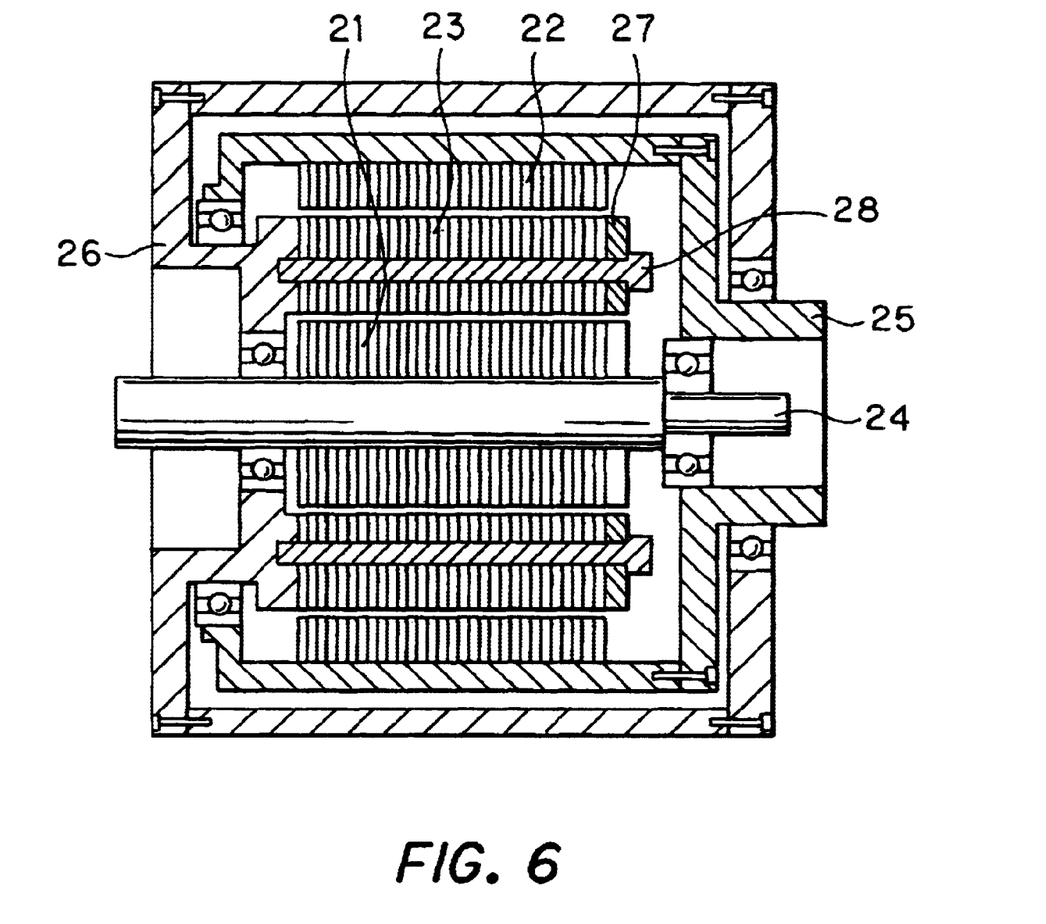
FIG. 6 is similar to FIG. 1, but showing a second embodiment of this invention.

FIG. 6 shows a second embodiment of this invention.

The electric rotating machine of the second embodiment, as in the case of the electric rotating machine shown in FIG. 1, is equipped with an inner rotor core 21 (inner core), outer rotor core 22 (outer core) and stator core 23 (middle core) which rotate relative to each other in the housing. In this embodiment, the stator core 22 is disposed outside the inner rotor core 21, and the outer rotor core 22 is disposed outside the stator core 23.

The inner rotor core 21, outer rotor core 22 and stator core 23 are respectively formed in stacks of plural thin silicon steel plates. The inner rotor core 21 is supported by a shaft 24, and the outer rotor core 22 is supported by a shaft 25. The stator core 23 is fixed to a flange 26 by bolts 28 together with a plate 27.

Figure 7:
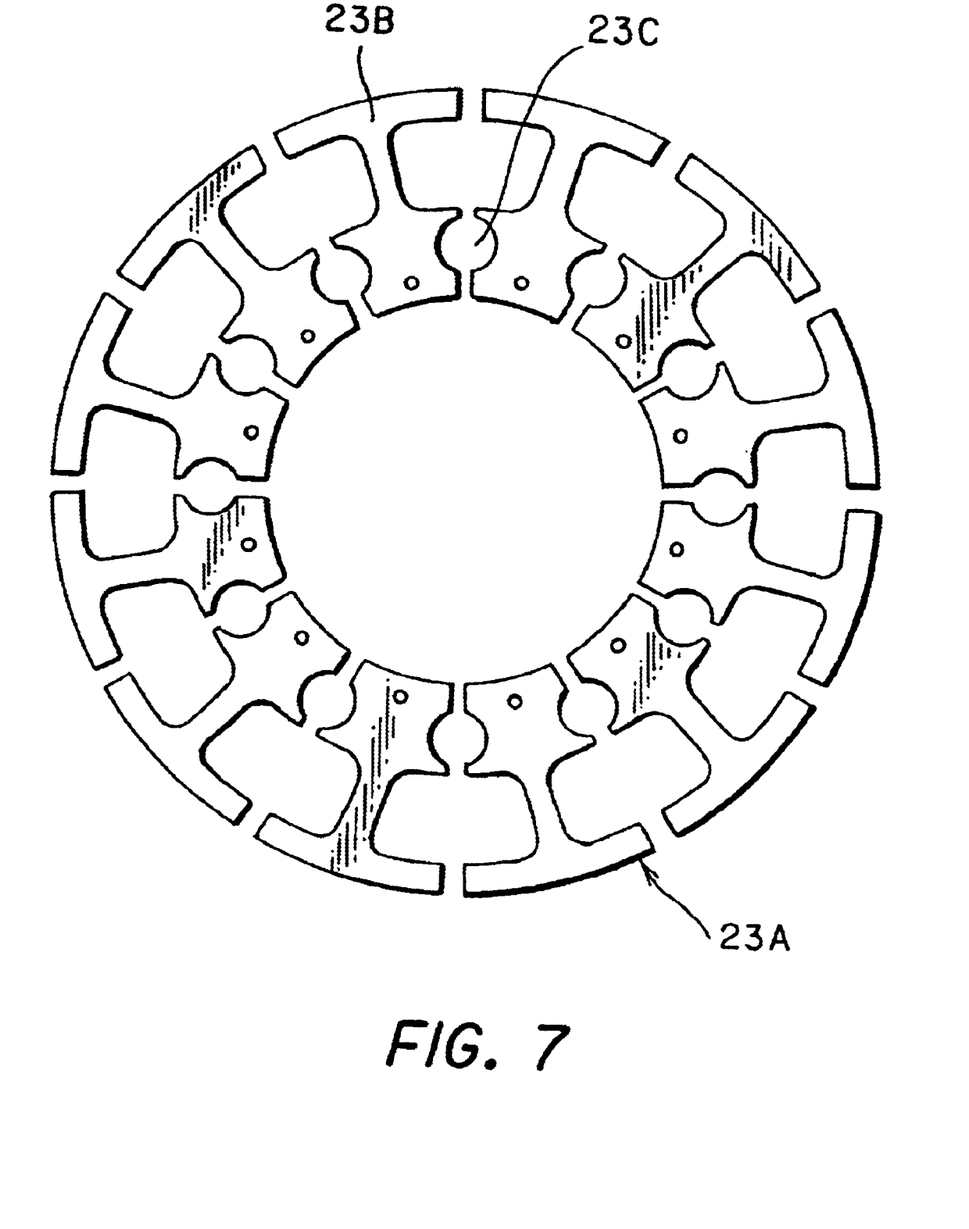
FIG. 7 shows a thin plate forming the stator core of the electric rotating machine of the second embodiment.

FIG. 7 shows a thin-plate 23A which forms the stator core 23. The thin-plate 23A comprises plural I-shaped split cores 23B on the same circumference. A space 23C through which a bolt 28 passes is formed between adjacent split cores.

Figure 8:
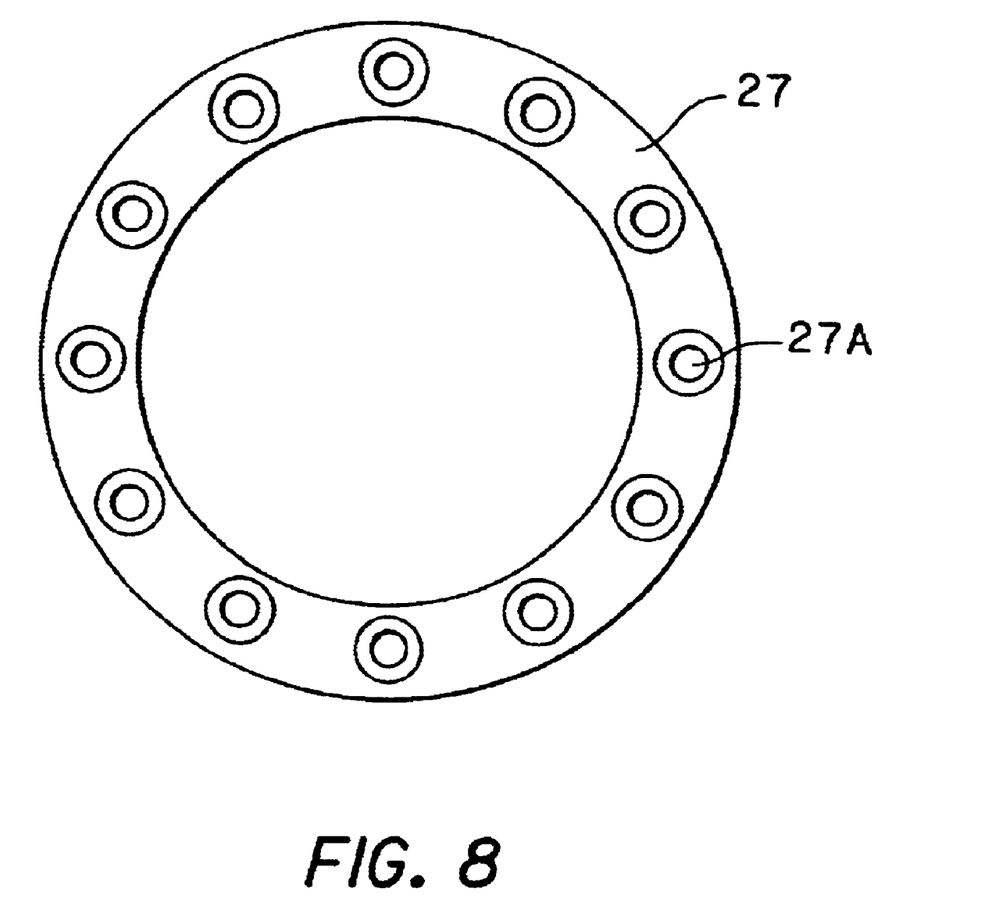
FIG. 8 shows the fixed plate of the electric rotating machine of the second embodiment.

FIG. 8 shows the plate 27. Holes 27A which have a seat for the bolt 28 are provided in the plate 27 at positions corresponding to the spaces 23C of the stator core 23.

The electric rotating machine shown in FIG. 6 is manufactured as follows.

In the inner rotor core 21 and outer rotor core 22, as only the surfaces facing the stator core 23 are magnetic pole-faces, plural thin plates are joined by welding the opposite side of the magnetic pole-faces. After welding, the parts which are the magnetic pole-faces of the joined thin plates are surface-finished.

In the stator core 23, both the inner circumferential surface and outer circumferential surface are magnetic pole-faces, so the thin plates cannot be fixed by welding. The spaces 23C are thus provided in each thin plate 23A and the thin plates 23A are then fixed by passing the bolts 28 through the spaces 23C.

Figure 9:
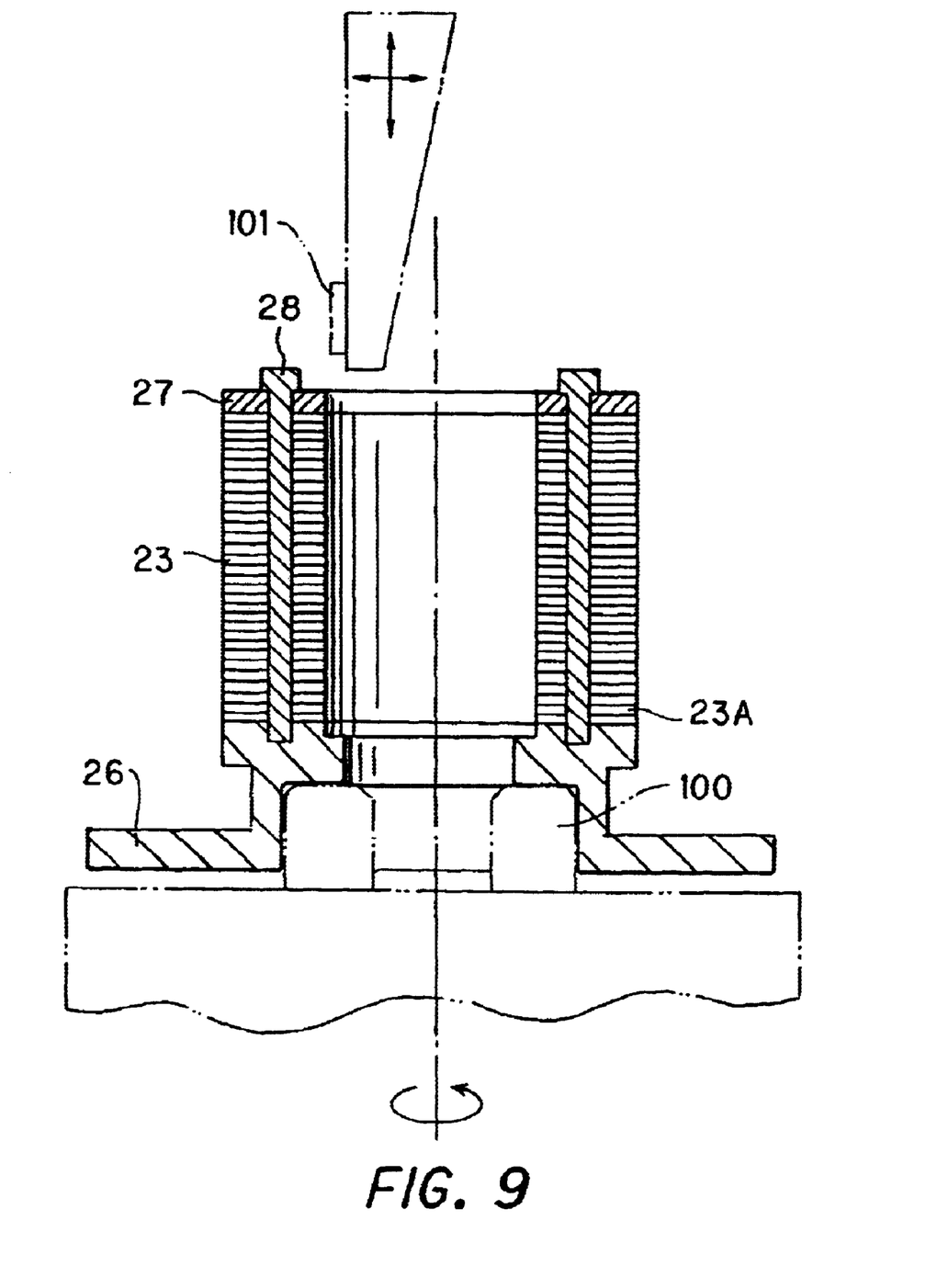
FIG. 9 shows a schematic cross-sectional view of the electric rotating machine of the second embodiment during assembly.

First, as shown in FIG. 9, the thin-plates 23A which form the stator core 23 are stacked, and are fixed to the flange 26 by the bolts 28 together with the plate 27. Next, the flange 26 to which the plates 23A and plate 27 are pre-attached are fitted on the chuck 100 of the grinding machine, and then the inner circumferential surface and outer circumferential surface of the stator core 23 are ground with the grindstone O1 by rotating them.

After surface finishing, the inner rotor assembled beforehand is inserted, and attached via a bearing. Also, the outer rotor assembled beforehand is attached to the outside of the stator via a bearing.

Holes, not shown, are provided for installing permanent magnets in the inner rotor core 21 and the outer rotor core 22, and parts, not shown, are provided for installing coils in the stator core 23. The permanent magnets and coils are respectively pre-attached to the rotor cores 21 and 22 or the stator core 23 prior to assembly.

Therefore, both the inner and outer circumferential surfaces are magnetic pole-faces, but the inner and outer surfaces are surface-finished when the stator core 23 is fixed only to the flange 26, so machining of the inner surface can be performed easily. The magnetic pole-faces can be finished precisely and the gap between cores can also be made small. Moreover, as welding is not used, the magnetic pole-faces are protected.

Figure 10:
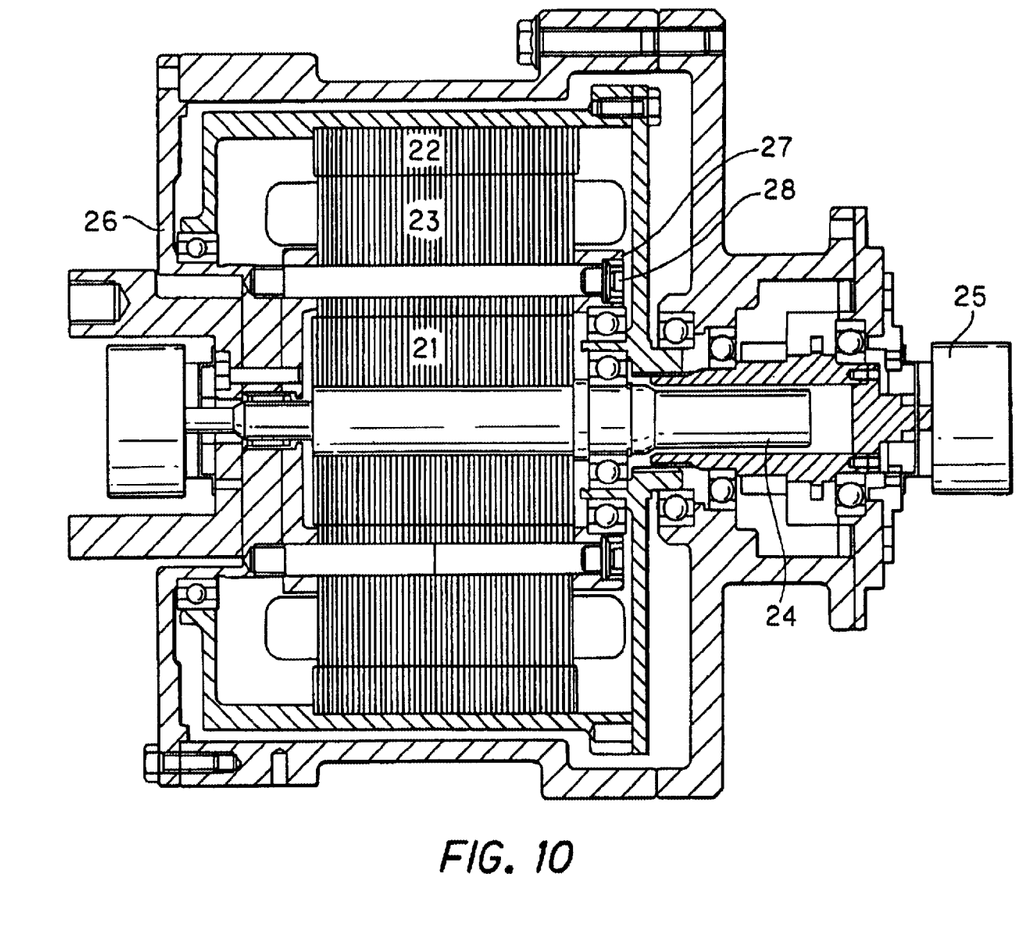
FIG. 10 shows a detailed cross-sectional view of the electric rotating machine of the second embodiment.

FIG. 10 shows a detailed cross section of the electric rotating machine shown in FIG. 6. In the schematic view of FIG. 6, shapes are drawn simplified for ease of understanding. The shapes of structural components are different between FIG. 6 and FIG. 10, but components referred to by the same number are identical components.

Herein, the thin plates forming the inner rotor core 21 and outer rotor core 22 are joined by welding, but holes may be opened in the thin plates forming them as in the case of the stator core 23, and they may then be joined by bolts.

This invention may be applied also to constructions other than those shown in FIG. 1 and FIG. 6. For example, this invention may be applied in a similar way to the inner rotor core of an electric rotating machine where the inner rotor core is disposed inside the outer rotor core and the stator core is disposed inside the inner rotor core by forming the inner rotor core in the same manner as shown in FIG. 1 or FIG. 3.

The entire contents of Japanese Patent Application P11-282352 (filed Oct. 4, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. An electric rotating machine, comprising:
   a middle core comprising plural plates stacked in an axial direction;

an outer core disposed outside the middle core, and which rotates relative to the middle core; and an inner core disposed inside the middle core, and which rotates relative to the middle core, wherein the plural plates are joined to a first fixing member by a connecting member, wherein the middle core is a stator core, and the outer core and inner core are rotor cores, and wherein the stator core is formed by a plural split core, the connecting member is a bolt, and a space through which the bolt passes is formed between adjacent split cores.

2. An electric rotating machine as defined in claim 1, wherein the plates are ring-shaped thin plates.

* * * * *